United States Patent
Bordawekar et al.

(10) Patent No.: US 10,049,134 B2
(45) Date of Patent: Aug. 14, 2018

(54) METHOD AND SYSTEM FOR PROCESSING QUERIES OVER DATASETS STORED USING HIERARCHICAL DATA STRUCTURES

(71) Applicant: International Business Machines Corporation, Armonk, NY (US)

(72) Inventors: Rajesh R. Bordawekar, Yorktown Heights, NY (US); Matthew L. Boyle, Whitinsville, MA (US); Jonathan W. Dale, Barto, PA (US); Vladimir Mordvinov, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 14/303,077

(22) Filed: Jun. 12, 2014

(65) Prior Publication Data

US 2015/0363465 A1     Dec. 17, 2015

(51) Int. Cl.
  *G06F 17/30*     (2006.01)

(52) U.S. Cl.
  CPC .. *G06F 17/30463* (2013.01); *G06F 17/30445* (2013.01); *G06F 17/30961* (2013.01); *G06F 17/30433* (2013.01)

(58) Field of Classification Search
  None
  See application file for complete search history.

(56) References Cited

U.S. PATENT DOCUMENTS

| | | | |
|---|---|---|---|
| 5,592,666 A | 1/1997 | Perez | |
| 6,931,418 B1 | 8/2005 | Barnes | |
| 7,945,581 B2 | 5/2011 | Bayliss et al. | |
| 8,126,870 B2 | 2/2012 | Chowdhuri et al. | |
| 2009/0112818 A1 | 4/2009 | Jose et al. | |
| 2011/0010358 A1 | 1/2011 | Zane et al. | |
| 2011/0016153 A1 | 1/2011 | Atta et al. | |
| 2011/0125730 A1 | 5/2011 | Bordawekar et al. | |
| 2012/0191699 A1 | 7/2012 | George et al. | |
| 2012/0192186 A1* | 7/2012 | Bornstein | G06F 9/5011 718/100 |
| 2014/0188841 A1* | 7/2014 | Sun | G06F 17/30483 707/718 |
| 2015/0058316 A1* | 2/2015 | Bruno | G06F 17/30442 707/718 |
| 2015/0234895 A1* | 8/2015 | Erdogan | G06F 17/30466 707/714 |
| 2017/0195412 A1* | 7/2017 | Abu-Ghazaleh | H04L 67/1044 |

OTHER PUBLICATIONS

Anonymous, "Method for Improving Query Performance in a Heterogeneous Database System," Database: IP.com; IP.com No. IPCOM000198309D, Aug. 4, 2010, 8 pages.

* cited by examiner

*Primary Examiner* — Albert Phillips, III
*Assistant Examiner* — Raheem Hoffler
(74) *Attorney, Agent, or Firm* — Kelvan Razavi; Ryan, Mason & Lewis, LLP

(57) ABSTRACT

Systems and methods for processing a query are provided. A method for processing a query of a tree-based dataset, comprises receiving the query, and analyzing the query and the dataset to create an execution plan for the query, wherein creating the execution plan comprises partitioning traversals over the dataset into sequential and parallel components, and distributing the components across a plurality of processing threads that independently traverse their portion of the dataset and compute local results. The method further comprises merging the local results to compute a final result.

15 Claims, 16 Drawing Sheets

500

400

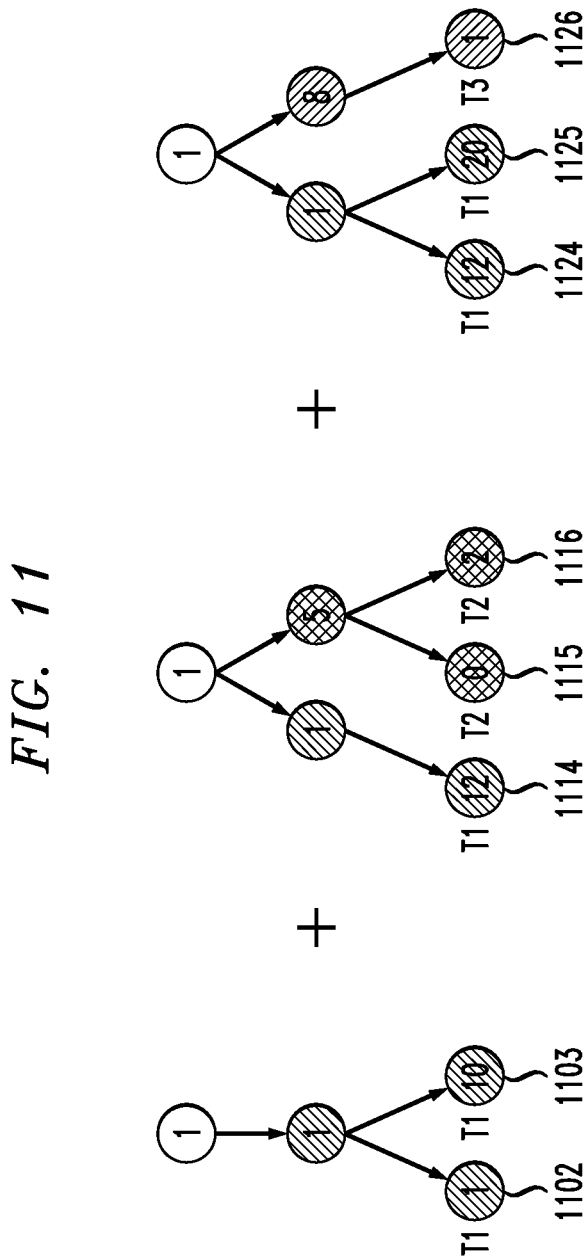

1700

1800

METHOD AND SYSTEM FOR PROCESSING QUERIES OVER DATASETS STORED USING HIERARCHICAL DATA STRUCTURES

TECHNICAL FIELD

The field generally relates to a method and system for processing a query and, in particular, to a method and system for processing a query over datasets stored using hierarchical data structures.

BACKGROUND

On-line analytical processing (OLAP) refers to a broad class of analytics techniques that process historical data using a logical multi-dimensional data model. Over the years, OLAP has emerged to become important business intelligence (BI) technology for solving decision support problems, such as business reporting, financial planning and budgeting/forecasting, trend analysis and resource management. OLAP technologies typically operate on data warehouses, which are subject-oriented, integrated, time-varying, non-volatile, and historical collections of data. Unlike on-line transaction processing (OLTP) applications that support repetitive, short, atomic transactions, OLAP applications are targeted for processing complex and ad-hoc queries over very large (e.g., multi-Terabyte and more) historical data stored in data warehouses.

OLAP applications can be used by knowledge workers (e.g., analysts, managers) to extract useful information from a set of large disparate data sources stored in data warehouses. These sources can be semantically or structurally different from each other and can contain historical data consolidated over long time periods. OLAP workloads involve queries that explore relationships within underlying data, and then exploit the acquired knowledge for different decision support activities, such as post-mortem analysis/reporting, prediction, and forecasting. The OLAP queries can invoke complex operations (e.g., aggregations, grouping) over a large number of data items or records. Thus, unlike the OLTP workloads, where transaction throughput is important, query throughput and response times are more relevant for OLAP workloads. Thus, an OLAP system supports a logical model that can represent relationships between records succinctly, a query system that can explore and exploit these relationships, and an implementation that can provide scalable performance.

Many OLAP systems are based on a logical data model that views data in a warehouse as multi-dimensional data cubes. The multi-dimensional data model grew out of a two-dimensional array-based data representation popularized by spreadsheet applications used by business analysts. A data cube is typically organized around a central theme, e.g., car sales. This theme is usually captured using one or more numeric measures or facts that are the objects of analysis (e.g., number of cars sold and the sales amount in dollars). Other examples of numerical measures can include, for example, budget, revenue, retail inventory, etc. The measures are associated with a set of independent dimensions that provides a context. For example, dimensions associated with a car sales measure can include, for example, car brand, model and type, various car attributes (e.g., color), geography, and time. Each measure value is associated with a unique combination of the dimension values. Thus, a measure value can be viewed as an entry in a cell of a multi-dimensional cube with a specified number of dimensions.

In the multi-dimensional OLAP model, each dimension can be further characterized using a set of attributes, e.g., a geography dimension can include country, region, state, and city. The attributes can be viewed as sub-dimensions and can themselves be related in a hierarchical manner. An attribute hierarchy can be a series of parent-child relationships that is specified by an order of attributes, e.g., year, month, week, and date. A dimension can be associated with more than one hierarchy, e.g., a time dimension can be characterized using at least two hierarchies, such as year, quarter, month, and date, and year, quarter, week, and date. The parent-child relationships represent orders of summarization via aggregation. The measure values associated with a parent are computed via an aggregation of measures of its children. Thus, dimensions, along with their hierarchical attributes, and the corresponding measures, can be used to capture relationships in the data.

In practice, a multi-dimensional OLAP model is usually implemented using one of three approaches: Relational OLAP (ROLAP), Multi-dimensional OLAP (MOLAP), and Hybrid OLAP (HOLAP). IBM® Corporation's TM1® product is an example of a MOLAP implementation. The MOLAP approach stores and processes multi-dimensional OLAP cubes as multi-dimensional arrays. Individual array locations are referred to as cells. The MOLAP cubes can be sparse multi-dimensional arrays that are stored using specialized data structures to optimize data access costs. The MOLAP approach is suitable for scenarios that process low-dimensional data, have repeated queries that touch the same data, and require fast query performance. Data stored in the MOLAP fashion is queried using languages that can express data access using the multi-dimensional array model. Examples of the languages include TM1® Rules and Microsoft® MDX.

OLAP usually involves processing large hierarchical multi-dimensional data. The OLAP data is typically sparse and represented in compact data structures such as trees. Execution of OLAP queries requires traversing different paths of the hierarchies, and performing aggregation operations on the corresponding data values.

Recently, sizes of the OLAP datasets have increased significantly, and with availability of large memories, it is possible to store large OLAP datasets entirely in memory. Even for in-memory OLAP data, depending on the amount of tree traversals, the query time can be significant. If a query is executed sequentially, it can reduce an overall throughput of the system, cannot exploit multi-core capabilities of current systems.

Accordingly, there is a need for systems and methods which are capable of more efficient query execution of OLAP datasets.

SUMMARY

In general, exemplary embodiments of the invention include methods and systems for processing a query and, in particular, to methods and systems for processing a query over datasets stored using hierarchical data structures.

According to an exemplary embodiment of the present invention, a system for processing a query, comprises an input module capable of receiving the query, and an analysis and execution module capable of analyzing the query and the dataset to create an execution plan for the query, wherein the analysis and execution module comprises a partition module capable of partitioning traversals over the dataset into sequential and parallel components, and a distribution module capable of distributing the components across a plurality of processing threads that independently traverse their portion of the dataset and compute local results. The system further comprises a merging module capable of merging the local results to compute a final result.

According to an exemplary embodiment of the present invention, a method for processing a query of a tree-based dataset, comprises receiving the query, and analyzing the query and the dataset to create an execution plan for the query, wherein creating the execution plan comprises partitioning traversals over the dataset into sequential and parallel components, and distributing the components across a plurality of processing threads that independently traverse their portion of the dataset and compute local results. The method further comprises merging the local results to compute a final result. The receiving, analyzing, partitioning, distributing and merging steps can be performed by a computer system comprising a memory and at least one processor coupled to the memory.

According to an exemplary embodiment of the present invention, a computer program product for processing a query of a tree-based dataset comprises a computer readable storage medium having program instructions embodied therewith, the program instructions executable by a processor to cause the processor to perform a method comprising receiving the query, and analyzing the query and the dataset to create an execution plan for the query, wherein creating the execution plan comprises partitioning traversals over the dataset into sequential and parallel components, and distributing the components across a plurality of processing threads that independently traverse their portion of the dataset and compute local results. The method further comprises merging the local results to compute a final result.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIG. 11 is a schematic diagram illustrating nodes belonging to sub-trees rooting from nodes to which particular threads have been assigned in connection with a method for processing a query in accordance with an embodiment of the present invention.

DETAILED DESCRIPTION OF EXEMPLARY EMBODIMENTS

Figure 1:
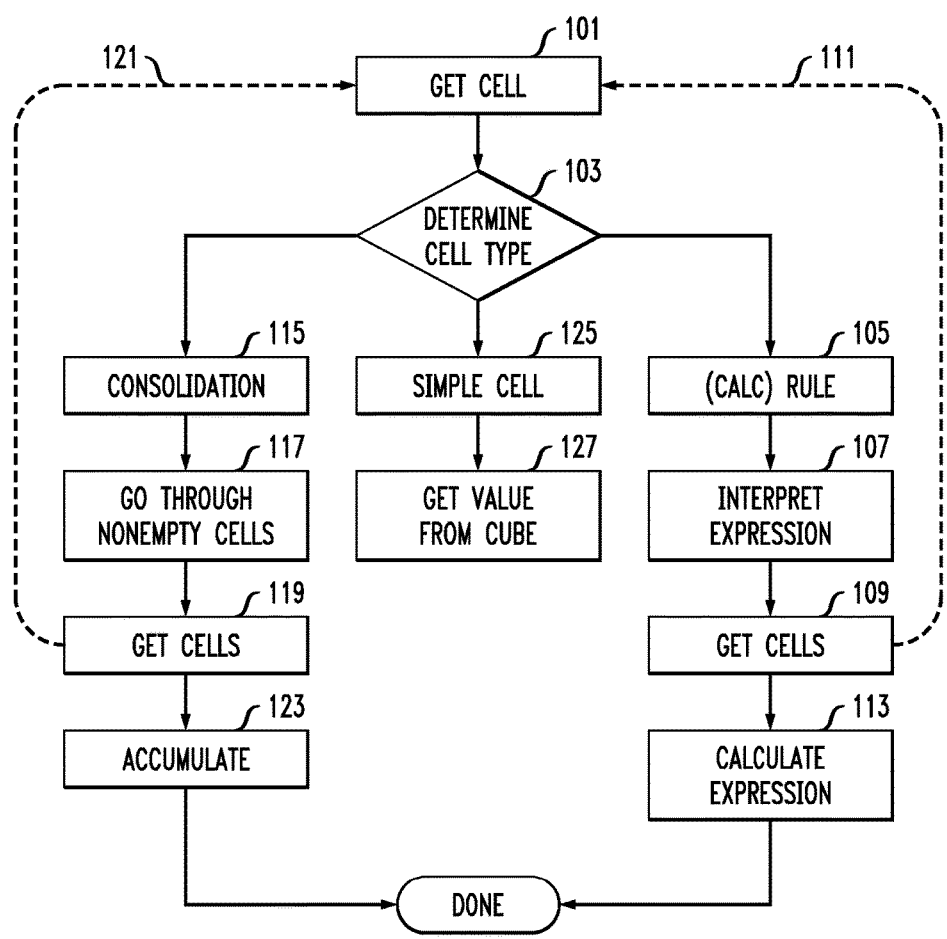
FIG. 1 is a flowchart illustrating a high level summary of a calculation process in TM1®.

Exemplary embodiments of the invention will now be discussed in further detail with regard to systems and methods for processing a query and, in in particular, to systems and methods that process a query over datasets stored using hierarchical data structures. This invention may, however, be embodied in many different forms and should not be construed as limited to the embodiments set forth herein.

Embodiments of the present invention include efficient scalable methods of parallelizing tree-based hierarchical OLAP queries over shared memory processors. Embodiments of the present invention may also result in a broadening of the spectrum of information technology (IT) professionals who are capable of creating optimized database definitions.

As used herein, "TM1®" can refer to an in-memory MOLAP database server. The architecture is optimized to represent complex data models efficiently in memory while providing fast data aggregation. Data in TM1® is stored in cubes. It is to be understood that TM1® is being used as an example for purposes of explanation and that the embodiments of the present invention are not necessarily limited to use with TM1®, and may be used with and/or incorporated into other database servers or systems.

As used herein, a "cube" can refer to a structure defined by an ordered set of dimensions, where a dimension is a set of elements. A cube is analogous to a table in relational database systems. Where a relational table is defined by two dimensions, rows and columns, a cube can have 2 or more dimensions. For example, TM1® allows a cube to be defined by up to 256 dimensions.

As used herein, a "dimension" is made up of a set of elements. These elements act as indices into a cube. For example, assuming a company wants to create a cube to hold the price and number of units sold for each of their products, the cube can include the following dimensions: Store ID (e.g., set of stores the company operates), Product ID (e.g., set of products the company sells), Date (e.g., date on which products are sold), Region (e.g., geographic region in which stores are located), Measures (e.g., labels that identify whether a cell in the cube contains the price or the units sold for a given product). Any cell in a cube can be addressed as a compound index consisting of a tuple containing one element from each of the five dimensions. For example, (S123, P789, June, Massachusetts, Units Sold) is the address of the cell containing the number of units of the product P789 sold in Massachusetts from store S123.

As used herein, "hierarchies" can refer to how elements in a dimension are arranged.

As used herein, a cube's "expanse" can refer to the n-ary Cartesian product of a cube's constituent dimensions, i.e., the set of all possible tuples (cells) that can be associated with a value. The subset of expanse-space tuples that have been associated with values comprises the cube's population.

Applications can refer to a slice of a cube by holding one or more of the elements in the tuple constant. Continuing the example used above, the tuple (*, *, *, Massachusetts, Units Sold) would address all cells in the cube containing the units sold for all products sold, on any date, in any store in Massachusetts.

As used herein, a "consolidated element" can refer to an element that contains children. The value of a cell indexed by a consolidated element is the summation of the values of all cells indexed by the child elements. Extending the example above, the Region dimension may contain a consolidated element for New England that is defined to be made up of the children {Maine, New Hampshire, Vermont, Massachusetts, Rhode Island}. The value of a cell defined by the tuple (S123, P789, June, New England, Units Sold) is the sum of the cells defined by the tuples (S123, P789, June, Maine, Units Sold), (S123, P789, June, New Hampshire, Units Sold), (S123, P789, June, Vermont, Units Sold), (S123, P789, June, Massachusetts, Units Sold), and (S123, P789, June, Rhode Island, Units Sold).

The TM1® OLAP engine contains a consolidation engine. Consolidated values are computed on demand and the results are cached for future use. The TM1® consolidation engine does weighted linear summation. The value of a parent is equal to the sum of its children. Children can be assigned weights to affect the consolidated value. If an application wants different algorithms for computed a cell's value, TM1® supports a Rules language that can encode business logic. Such cells are referred to as calculated (CALC) cells.

TM1® calculations are done on demand. Calculations can also be recursive, in that calculating one cell may demand the calculation of other cells. This process is repeated until all values are resolved, so as to provide fast response to changes. Calculations are done cell-by-cell or as a view.

As used herein, a "trie" (also referred to as "prefix tree" or "tree") or a "trie structure" (also referred to as "prefix tree structure" or "tree structure") can refer to an ordered tree structure where cube data is stored, where a path from root to leaf represents a cell. Any cell from a notional space of the cube ("expanse," see above) that is associated with a value will have a path in the trie, with the value stored at the leaf. All paths in the trie have the same length, equal to the dimensionality of the cube, and consequently, a trie is inherently unbalanced. Aggregations are not stored in the cube data trie. Rather, they are calculated on demand. A cube's dimensions represent directed graphs of elements, with weights associated with edges. For every aggregated element, the absolute leaves along with weight within that element are stored so that a full hierarchy need not be traversed at runtime. In addition to aggregations, TM1® also supports calculating cell values using Rules language. Like aggregations, calculated values are computed on demand and are not stored in the data tree.

As used herein, an "operation" can refer to a part of a program activity to be parallelized. Program execution could contain multiple instances of the operation. Several operations could be executed concurrently.

As a used herein, a "work unit" (of operation) can refer to a subset of the operation that can be executed independently of other operation parts, and may be represented as part of an array, for example, a tree structure, portion of a tree structure referred to herein as a "sub-tree," or a portion of a sub-tree.

As used herein, a "first level transaction" or "transaction" can refer to a transaction associated with TM1® application programming interface (API) call or Turbo Integrator (TI) process.

As used herein, a "transaction thread" can refer to a thread executing first level transactions. Transaction threads can be represented by TM1® UserThread instances, created by a TM1 server for every connection established by a TM1® client or by TM1® ChoreThread instances created to execute TI processes.

As used herein, an "operation thread" can refer to a thread designated for parallel processing of work units.

As used herein, an "operation thread pool" can refer to a set of operation threads re-used for processing of multiple instances of operation work units executed in parallel.

As used herein, a "nested transaction" can refer to a transaction branching out first level transaction activity into multiple parallel execution streams. Nested transactions correspond to the activity assigned to work units.

The flowchart in FIG. 1 presents a high level summary of a calculation process 100 in TM1®. At block 101, when a cell is requested (assuming that it is not in a view that has already been calculated), a server will perform the following process. At block 103, a cell type is determined. If the determination is calculation by rule 105, the rule script is interpreted (block 107), and the first cell required for the calculation is gathered (block 109). The server recurses back 111 to get a value of the cell required for calculation and the expression is calculated at block 113. For example, if the expression at block 107 is C=A+B, at block 109 cell values for A and B would be requested. Then, at block 113, the calculated value for C would be returned.

If it is determined that the cell is consolidated (block 115), a server runs through leaves that makeup the cell (block 117), gets cells at block 119 and gets the value for every cell feeding the consolidation by recursing back 121, which the result then is accumulated (block 123) into the consolidation 115.

If it is determined that the cell is a simple cell 125, the value of the cell is obtained from the cube (block 127). The process continues evaluating rules, getting more cell values and recursing as needed until done.

As used herein, a "consolidated view" can refer to a two-dimensional "subcube" of a cube. A consolidated view can be defined by putting some dimensions as rows and columns, and some as titles. The view shows a subset of the row and column dimensions and a single element of each title dimension. A server running reasonably large cubes containing, for example, more than one million cells could incur significant performance cost when consolidating cells associated with leaf members into rollup values. The consolidation operations are invoked when a user requests rollup values on a cold system, when a given set of rollup values has not been previously calculated. After rollups are first computed, they are normally cached in the view storage or calculation cache (unless server settings prevent caching). In other scenarios, consolidation operations could be invoked after cube data was changed. This leads to invalidation of rollup values computed earlier and the consolidation values have to be re-computed from scratch.

Consolidation queries in TM1® views are often satisfied by building an internal structure known as a "Stargate." As used herein, a "Stargate" can refer to a snapshot cube, typically of lower dimensionality than a source cube. View axes are represented by dimensions in the Stargate cube, while contextual elements that are invariant in all requested cells are omitted. When such context elements (called "titles" or "slicers") represent an aggregation, the component data is "flattened" in the resulting Stargate cube. A Stargate is constructed by traversing the source cube's expanse, or more typically, the source cube's population, and aggregating visited cells into the Stargate cube.

Traversing the expanse refers to enumerating all possible cells, while traversing the population can be a more efficient depth first search of the cube data trie. In either case, the search space is constrained by a set of filters. View axes are requested in terms of a subset. The absolute leaves of an aggregated element included in an axis subset are added to that subset before it can be used as a filter. These axis subsets taken together are known as the "axis leaf subset" (ALS), and comprise the dimensionality of the resulting Stargate cube.

View titles that are not aggregations can conceptually be thought of as a filter set of cardinality 1, while the absolute leaves of an aggregated title form the filter set to be applied to that title's containing dimension in the source cube. A positional cursor is maintained in both the input cube and output Stargate cube as the search space is traversed. Each leaf value (simple or calculated) is then used to adjust the corresponding value in the Stargate cube, taking into account that cell's weight in any title aggregations.

The cost of view calculation using the Stargate algorithm can be prohibitive, in particular, when the number of non-null cells is large. In such cases, parallelizing the computation can improve performance.

Figure 2:
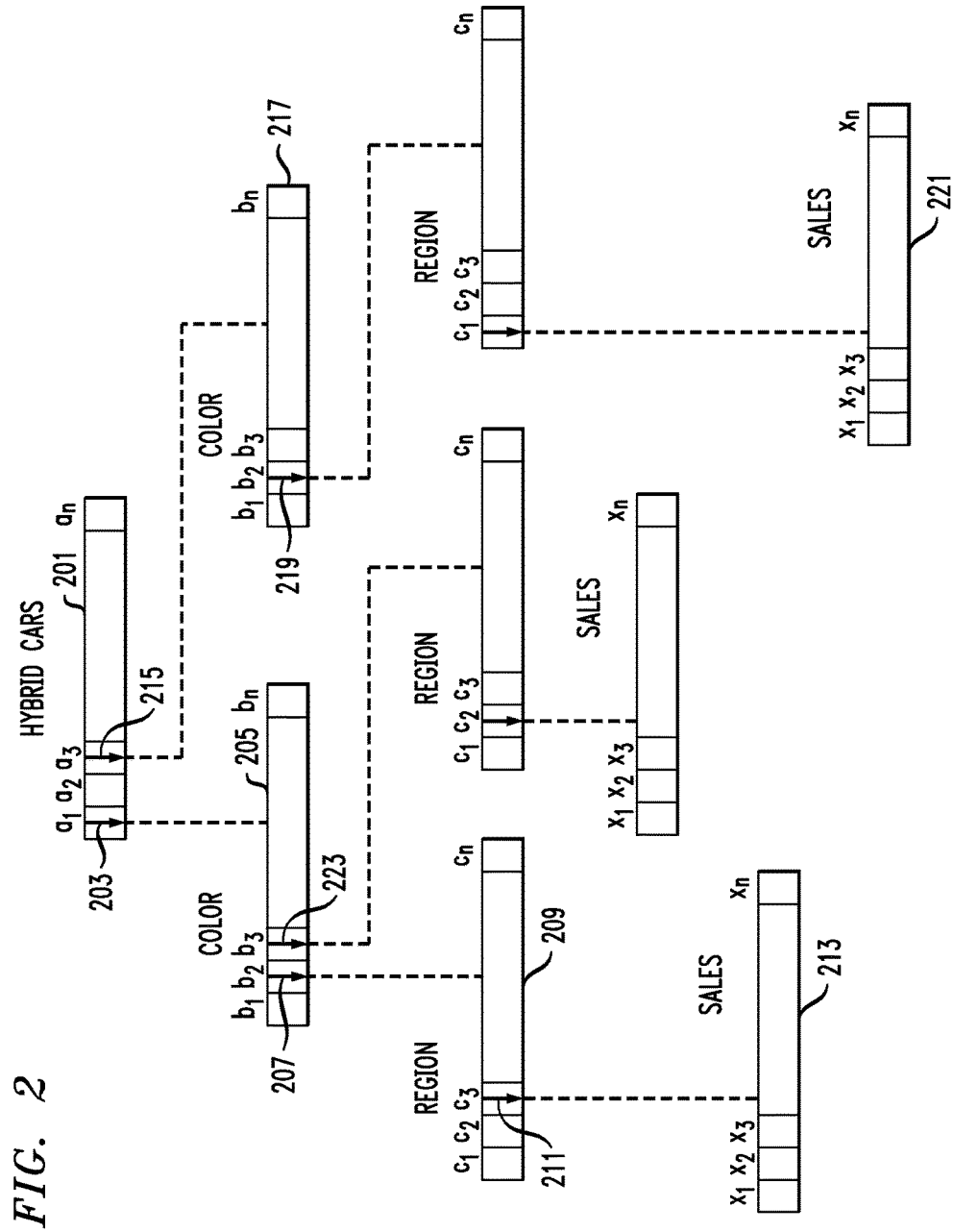
FIG. 2 is a schematic diagram of a method for storing database-pointers and values for a multi-dimensional array.

Referring, for example, to U.S. Pat. No. 5,592,666, which is commonly assigned to the assignee of this application, and is incorporated by reference herein in its entirety, a storage and retrieval scheme has been developed for values within a multi-dimensional array using a hierarchy of database pointers. Referring, for example, to FIG. 2, to store a value, the elements corresponding to the value are determined. Assume, for example, that the elements for a first value are $a_1$, $b_2$, $c_3$ and $x_2$ for a first, second, third and last dimension, respectively. A storage node 201 corresponding to the array's first dimension, for example, "Hybrid cars," as shown in FIG. 2, is established within a computer's database, and space within this storage node is allocated for all of the elements corresponding to this dimension ($a_1$, $a_2$, $a_3$, . . . , $a_n$). A database-pointer 203 then is stored in a storage location $a_1$ within this storage node corresponding to the element for the first value's first dimension.

A second storage node 205 then is established within the computer's database corresponding to database-pointer 203 and to the array's second dimension, for example, "Color." Space within this storage node is allocated for all of the elements corresponding to the second dimension ($b_1$, $b_2$, $b_3$, . . . , $b_n$). Database-pointer 203 is caused to point to storage node 205 corresponding to the second dimension. A database-pointer 207 is stored within storage node 205 at a storage location $b_2$ corresponding to the element for the first value's second dimension.

A third storage node 209 then is established within the computer's database corresponding to database-pointer 207 and also to the array's third dimension, designated, for example, "Region." Space within this third storage node is allocated for all of the elements within the array's third dimension, for example, "Region" ($c_1$, $c_2$, $c_3$, . . . , $c_n$). Database-pointer 207 is caused to point to storage node 209. A database-pointer 211 is stored within storage node 209 at a storage location $c_3$ corresponding to the element for the first value's third dimension.

These steps are repeated for each of the array's dimensions until a storage node 213, corresponding to the array's last dimension (e.g., "Sales"), is established. The first value is stored in a storage location $x_2$ corresponding to the element for the value's last dimension.

When a second value is stored within the multidimensional array, similar steps are effected. If the element corresponding to the second value's first dimension is the same as that for the first value, no new database pointer is stored in storage node 201. On the other hand, if the element corresponding to the second value's first dimension is different from that for the first value, e.g., is $a_3$, then a second database-pointer 215 is stored within storage node 201 at a storage location $a_3$ corresponding to this element.

A new storage node 217 then is established within the computer's database, in a manner similar to that described above, corresponding to database-pointer 215 and also to the array's second dimension. Space within storage node 217 is allocated for all of the elements of the second dimension ($b_1$, $b_2$, $b_3$, . . . , $b_n$). Database-pointer 215 is caused to point to storage node 217. A database-pointer 219 is stored within storage node 217 at a storage location $b_2$ corresponding to the element for the second value's second dimension. These steps are repeated, as for the first value, until the second value is stored in a storage node 221 at a storage location $x_3$, corresponding, respectively, to the array's last dimension and the second value's element for this dimension.

If the element corresponding to the first dimension is the same for the first value and the second value, a database-pointer 223 corresponding to the element for the second value's second dimension is stored in storage node 205. This storage node is the same storage node in which database-pointer 207 is stored which corresponds to the element for the first value's second dimension. Assuming the elements for the first and second values' second dimension are different, the hierarchical tree of database-pointers for these values splits at storage node 205, rather than storage node 201.

In accordance with this scheme, therefore, in order to insert into, or withdraw from, the multidimensional array a particular value, the element identifiers corresponding to the value are determined. For the insertion step, database-pointers, and finally the value, are placed within storage nodes corresponding to the array's various dimensions. The value is withdrawn from memory by tracing the hierarchy of database-pointers defined by the value's element identifiers.

Embodiments of the present invention provide systems and methods for partitioning traversals over a data tree into sequential and parallel components. In accordance with an embodiment of the present invention, a heuristic balances an amount of available work that can be distributed across multiple threads and an amount of sequential computation. Parallel work is distributed such that individual threads traverse distinct portions of a data space. A tree partitioning heuristic partitions a tree such that the amount of work per thread (or a number of distinct portions per thread) are more than a certain threshold. The threads independently traverse allocated portions of the data tree, and compute local results. These results are then merged to get a final result.

In accordance with embodiments of the present invention, users can specify a number of threads used in the query or the system can choose the number of threads to be used for parallelization. The parallel work can be statically assigned to the threads or threads can share work using work-stealing techniques.

Figure 3:
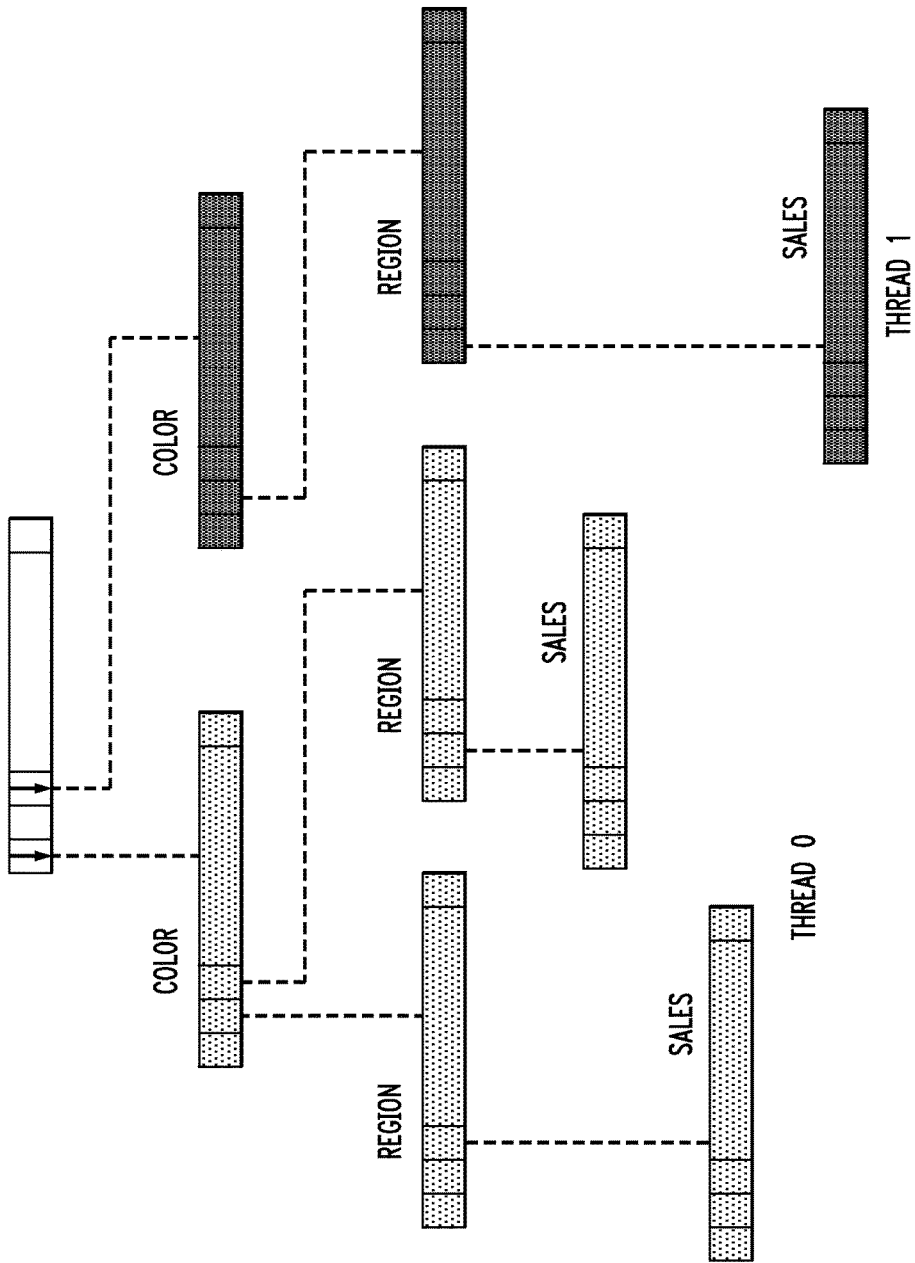
FIG. 3 is a schematic diagram of a method for parallelization for a multi-dimensional array.

Referring, for example, to FIG. 3, a process wide pool of work units is maintained in order to dispatch work units between operation threads (e.g., Thread 0 and Thread 1), and to drive load balancing between concurrent operations.

FIG. 3 shows a simple example of a data tree for a cube "Hybrid cars" with three dimensions: Color, Region, and Sales. Data structures based on trees could be processed in parallel by identifying subtrees to be handled independently by worker threads. FIG. 3 branches these subtrees at the Color dimension. Methods in accordance with embodiments of the present invention described herein associate subtrees with units of work that could be executed independently of each other. A work unit pool collects and keeps track of current work units for a given server instance and distributes work units across operation threads.

A Work Unit Pool is organized as a Work-Unit-Pool-Map:
Transaction ID=>{Queued Work units; Running Work Units; Work Units for Serialized execution}

According to an embodiment of the present invention, the ID of the main thread is used in order to reflect the transaction ID. This map allows balancing the number of operation threads used for a given transaction.

The number of allowed running work units associated with a given transaction is calculated using equation 1 as:

$$AllowedNumberOfRunningUnits = \qquad (1)$$
$$Ceiling\left(\frac{NumberOfOperationThreads}{NumberOfParallelizedTransactions}\right) +$$
$$(Main - Transaction - Treads - Is - Busy?)$$

where NumberOfParallelizedTransactions=size (Work-Unit-Pool-Map) and MainTransactionTreadsIsBusy flag can be 0 or 1, and is set to false (i.e., 0), when the work unit handled by the main transaction thread is finished and this thread also enters a loop looking for work units.

When the actual number of running work units exceeds an allowed number, the exceeding subset of the work units needs to be interrupted for a rebalancing distribution of operation threads across transactions. The remaining work of the interrupted units is put on a queued work unit list.

When the actual number of running work units plus the number of queued work units is lower than the allowed number, some work units could be split to engage more operation threads, which are reading from the work unit pool. The number of additional work units that can be created is given by equation 2:

$$NumberOfRemainingUnitSlots = AllowedNumberOfRunningUnits - \qquad (2)$$
$$CurrentNumberOfRunningUnits - CurrentNumberOfQueuedUnits$$

Operation threads access a Work Unit Pool to retrieve a unit to be processed. A system in accordance with an embodiment of the present invention loops over transactions in a Work-Unit-Pool-Map starting from the last serviced transaction. The first transaction that has queued work units and does not exceed an allowed-number-of-running-work-units gets serviced.

Operation threads execute the following cycle:

```
Loop (until Exit-Event)
{
    Get queued Work Unit
    If (work unit found)
        Execute work unit
    else
        Wait for New-Work-Unit-Event or Exit-Event
}
```

In accordance with an embodiment of the present invention, operation threads are kept in an Operation Thread Pool of process scope. A maximum size of an Operation Thread Pool is defined in the configuration file. Initially the Operation Thread Pool is empty, and grows on demand up to the allowed maximum.

When a Work Unit Pool receives a new work unit to be queued, it notifies the Operation Thread Pool. The Operation Thread Pool searches for the first non-busy operation thread and sends it a New Work Unit Event. If all operation threads are busy and the maximum number of operation threads is not reached, a new operation thread is created.

Figure 4:
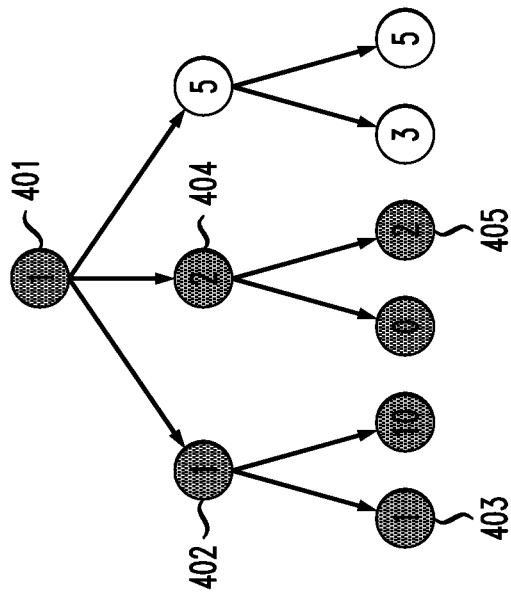

Referring to FIG. 4, which is a tree structure used in a method for processing a query in accordance with an embodiment of the present invention, a constant-depth tree 400 containing data at the leaf nodes is traversed. An example of the constant-depth tree 400 may be, for example, a TM1® Stacked Trie data structure.

With respect to node traversal, in accordance with an embodiment of the present invention, this kind of a tree can be divided into sub-trees defined by their left-most and right-most branches, also referred to herein as minimum and maximum branches. The sub-trees limited by minimum and maximum branches are associated with the work units enabling parallelization of the tree traversal.

Referring to FIG. 4, for purposes of explanation, the nodes in the tree are assumed to be associated with numbers, which are referred to herein as coordinates. Coordinates are unique and sorted under a given parent node. The coordinates are used to define the sub-trees. Coordinates in a TM1® Stacked Trie structure are IDs of TM1® elements.

The shaded part of the tree 400 can be described by coordinates (1,1,1)-(1,2,2) of the left-most and right-most branches 401, 402 and 403, and 401, 404 and 405. A sub-tree can also be identified by filtering criteria, which would look similar to the coordinate based sub-tree specification, with the exception that the filtering criteria could refer to coordinates not present in the tree, yet still separating the sub-tree from the rest of the tree. Examples of the criteria resulting in the same sub-tree would be: [(1,1,0)-(1,2,3)] or [(0,0,0)-(1,2,max)]. For example, the first elements in these notations [(1,1,0)-(1,2,3)] or [(0,0,0)-(1,2,max)]. [(1 . . . )-(1 . . . )] mean that an ID of the element of the first(root) level of the tree should be exactly 1. [(0 . . . ) -(1 . . . )] means that an ID of the element of the first(root) level of the tree should be ≥0 and ≤1. Given this level contains only a single element with ID=1, both conditions render the same result. The same logic applies for the second level of this notation [(1,1,0)-(1,2,3)] or [(0,0,0)-(1,2,max)]. The conditions are a bit different, but for this tree, they render the same result nodes satisfying this condition.

The filtering criteria will include the trailing parts based on 0 to max boundaries. In accordance with an embodiment of the present invention, these portions of the sub-tree filtering criteria can be omitted. For example, [(0,0,0)-(1,2,max)] could be replaced with the shorter form [(0,0)-(1,2)] and [(1,1,0)-(1,2,max)] could be replaced with the shorter form [(1,1)-(1,2)]. According to an embodiment, the leading part that is shared by the branch vectors, i.e., the apex part of the sub-tree, can be specified once, so [(1,1)-(1,2)] can be further shortened as [1, (1)-(2)]. This notation can be used when logging work unit related events.

Figure 5:
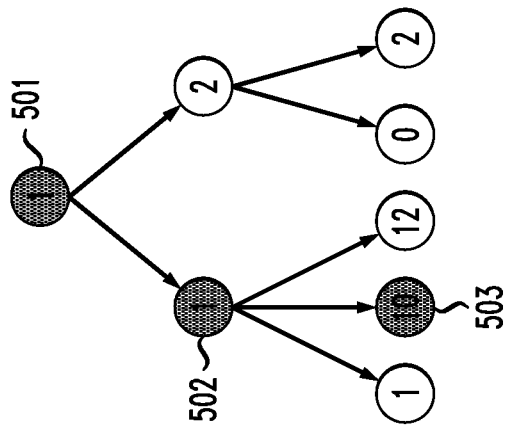
FIGS. 4 and 5 are schematic diagrams of tree structures used in a method for processing a query in accordance with an embodiment of the present invention.

Referring to the tree 500 in FIG. 5, dynamic work load balancing uses predefined intervals in the work unit execution to analyze if the work unit is to be split in order to be distributed between operation threads or to balance operation threads across concurrent operations.

In accordance with an embodiment of the present invention, a split analysis check point occurs after a given interval of tree traversal in the context of a currently visited leaf node. The intervals are defined based on time passed or number of leaf nodes visited since a previous event.

Referring to FIG. 5, the check point occurs when visiting the shaded nodes 501, 502, 503, with coordinates (1,1,10), while traversing the sub-tree: [1, (1)-(2)].

In accordance with an embodiment of the present invention, the following logic is used in order to determine if a split is required. If an AllowedNumberOfRunningUnits (see Eq. 1 above) is exceeded by an actual number of running-units for a given transaction, then a current work unit is Split-For-Interruption. If an AllowedNumberOfRunningUnits is higher than an actual number of running and queued units for a given transaction, then a current work unit is Split-For-Parallelization.

Split for Interruption

According to an embodiment, Split for interruption makes the following transformations:

Limits current work unit with the coordinates of the current leaf node.

Creates new work unit reusing the right-most filtering criteria (of maximums) of the original work unit and using left-most criteria based on the coordinates of the current leaf node incremented by 1 at the lowest level.

Figure 6:
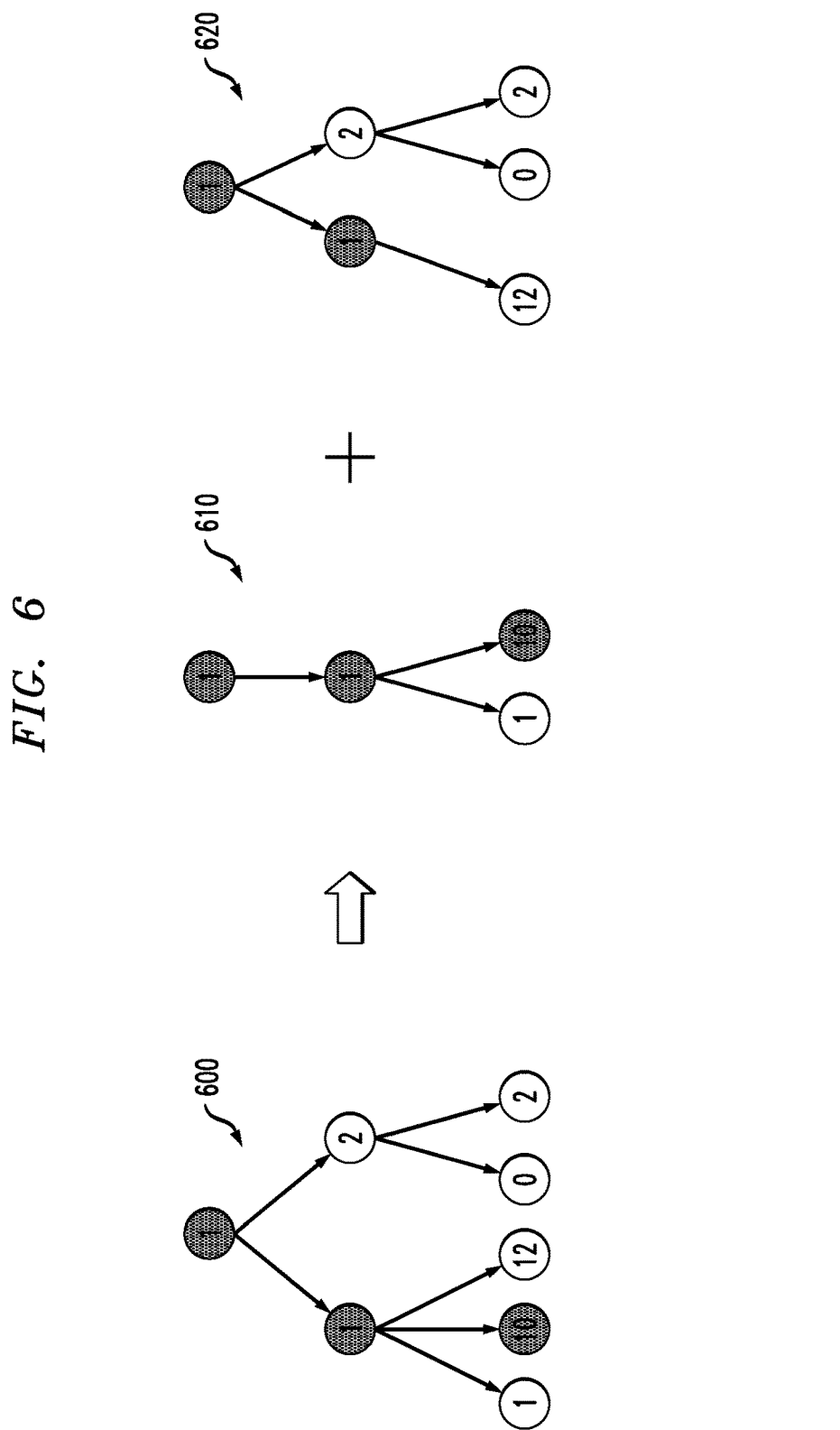
FIG. 6 is a schematic diagram illustrating tree structures in connection with a split for interruption used in a method for processing a query in accordance with an embodiment of the present invention.

For example, referring to FIG. 6, the split occurring at the leaf node (1,1,10) of the work unit [1, (1)-(2)] corresponding to tree 600 will result in the creation of the following 2 work units corresponding to the trees 610, 620:

[1, (1)-(2)]=>[1, 1, (0-10)]+[1, (1, 11)-(2,max)]

or using full notation of these work units:

[(1, 1, 0)-(1, 2, max)]=>[(1, 1, 0)-(1, 1, 10)]+[(1, 1, 11)-(1, 2, max)]

The current work unit corresponding to tree 600 is effectively positioned at the last point of the traversal, which means it will be finished shortly after the split check point.

The extracted part of the work unit corresponding to the trees 610, 620 will be queued for further distribution among operation threads.

Figure 7:
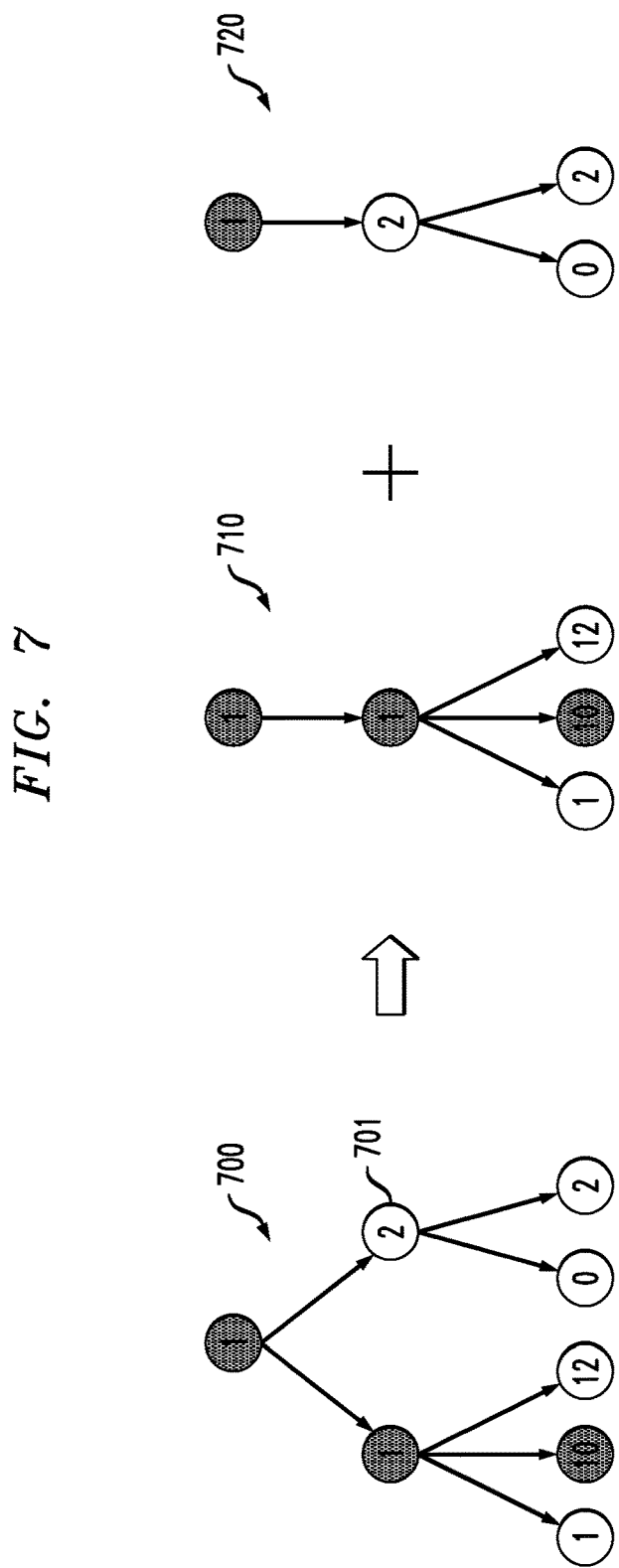
FIGS. 7 and 8 are schematic diagrams illustrating tree structures in connection with a split for parallelization used in a method for processing a query in accordance with an embodiment of the present invention.

Split for Parallelization According to an embodiment, Split for parallelization breaks an unvisited portion of a tree to distribute it across several work units. Referring to FIG. 7, the Split for parallelization method breaks the tree 700 at the first level containing nodes that have not yet been visited to result in trees 710 and 720. For example, a current pass of the tree traversal is at (1,1,10) as indicated by the shaded portion in tree 700, and the split occurs at the second level which contains yet to be visited node 701 (1,2).

Figure 8:
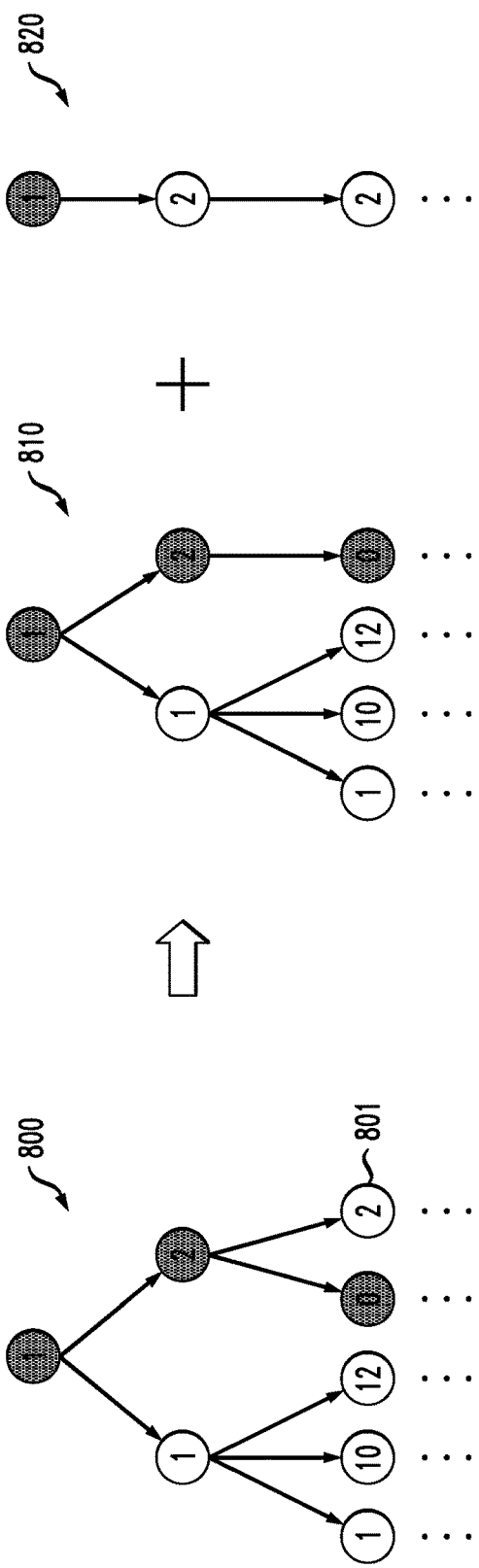

In accordance with an embodiment, if the tree traversal position does not leave unvisited nodes on a particular level (e.g., the second level), the split occurs on one level down if that level contains unvisited nodes. For example, referring to FIG. 8, a current pass of the tree traversal is at (1,2,0) as indicated by the shaded portion in tree 800, and the split occurs at the third level which contains yet to be visited node 801 (1,2, 2) to result in trees 810 and 820.

According to an embodiment, the number of subtrees created as a result of the split is determined as a minimum of the number of nodes left unvisited at the split level and the number of operation threads available for the transaction (see Eq. 2 above) plus one operation thread to account for the current unit.

Supporting Nested Transactions—Tree Merge Parallelization

Figure 9:
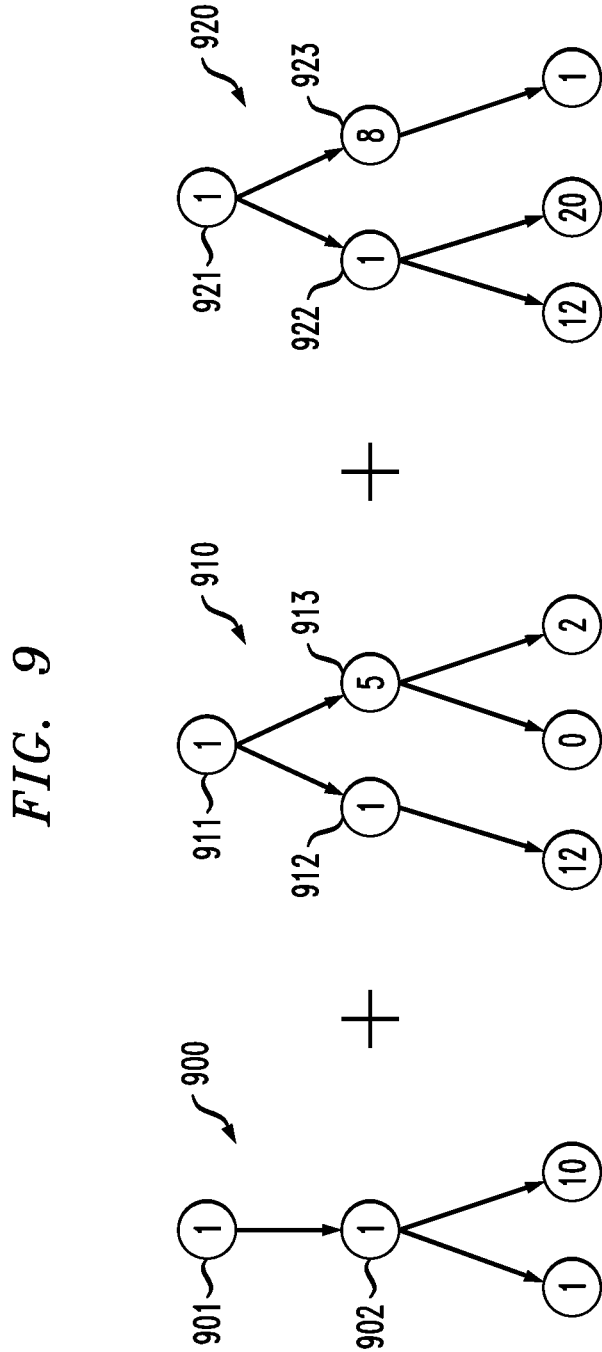
FIG. 9 is a schematic diagram illustrating a set of trees to merge in connection with a method for processing a query in accordance with an embodiment of the present invention.

In accordance with an embodiment, merging trees are parallelized. FIG. 9 illustrates trees 900, 910 and 920 to be merged. Referring to FIG. 10A, in a first phase, referred to as a single thread breadth first merge, nodes in a single thread execution are merged at two levels to form a tree 1000. More specifically, nodes 901 and 902 of tree 900, nodes 911, 912 and 913 of tree 910, and nodes 921, 922 and 923 of tree 920 are merged to form tree 1000. While merging at two levels is described, it is to be understood that the embodiments of the present invention are not necessarily limited to merging at two levels, and merging may be performed at more than two levels.

Figure 10B:
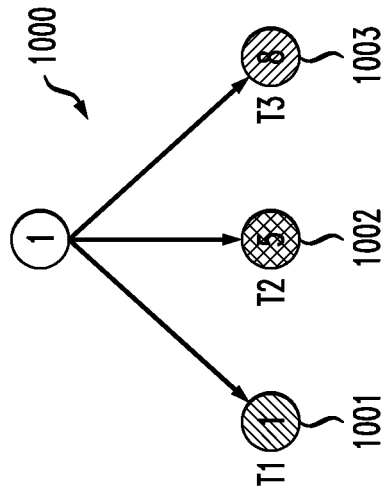
FIGS. 10A and 10B are schematic diagrams illustrating merging of nodes at a first two levels and an assignment of threads in connection with a method for processing a query in accordance with an embodiment of the present invention.
Figure 10A:
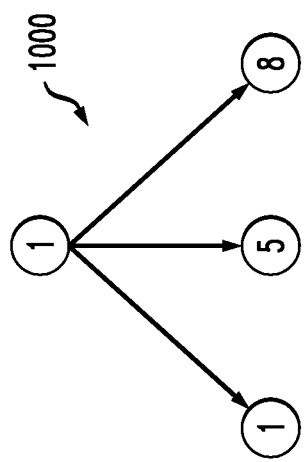

Referring to FIG. 10B, in a second phase, referred to as a parallelized merge on sub-tree roots, leaves 1001, 1002 and 1003 of the tree 1000 are assigned to different threads, Thread 1 (T1), Thread 2 (T2) and Thread 3 (T3). As can be understood from FIG. 11, every thread scans through the trees being merged, but only looks at the nodes belonging to the sub-tree rooting from the node the thread is assigned to. For example, referring to FIGS. 10 and 11, the nodes 1102, 1103, 1114, 1124 and 1125 belong to the sub-tree rooting from node 1001 to which Thread 1 is assigned. The nodes 1115 and 1116 belong to the sub-tree rooting from node 1002 to which Thread 2 is assigned. The node 1126 belongs to the sub-tree rooting from node 1003 to which Thread 3 is assigned. In accordance with an embodiment, modifications of the resulting tree structure made by individual threads are localized to the assigned sub-tree, avoiding thread interference.

Figure 12:
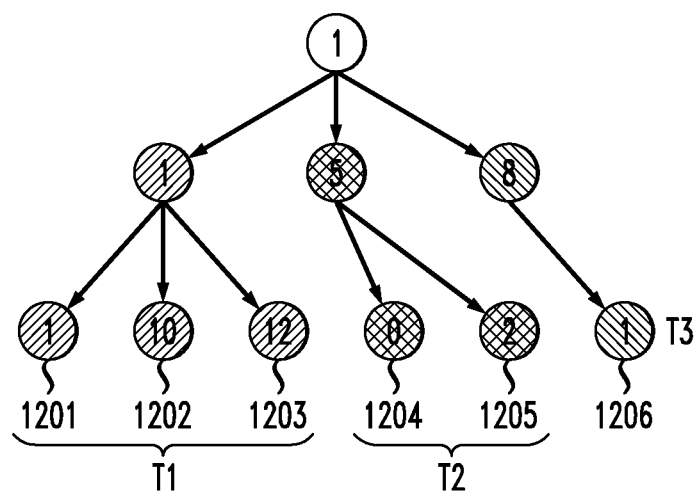
FIG. 12 is a schematic diagram of merged tree structure in a method for processing a query in accordance with an embodiment of the present invention.

The resulting merged tree 1200 is illustrated in FIG. 12, which includes nodes 1201, 1202 and 1203 belonging to Thread 1, nodes 1204 and 1205 belonging to Thread 2 and node 1206 belonging to Thread 3.

Figure 13:
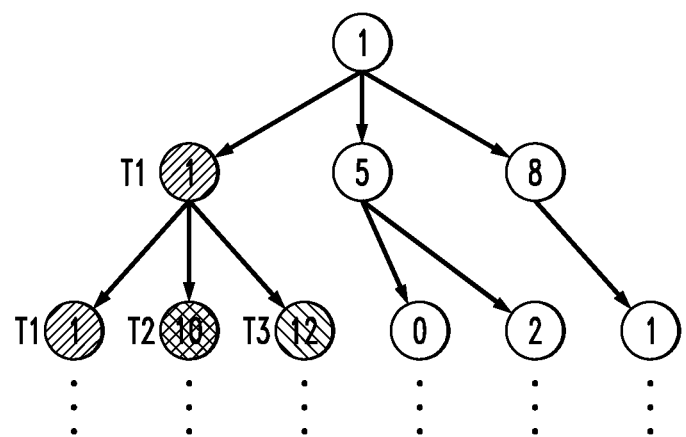
FIG. 13 is a schematic diagram of the merged tree structure of FIG. 12, in which load balancing has been performed in a method for processing a query in accordance with an embodiment of the present invention.

In a third phase, load balancing utilizing recursive splitting within a sub-tree is performed. When some of the operation threads finish their sub-trees and become available to take on more work, the breadth first merge with subsequent parallelized in-depth population could be recursively repeated. For example, referring to FIG. 13, when Thread 2 and Thread 3 are finished with the sub-trees to which they are assigned ((1,5) and (1,8)), Thread 1 will force population of the third level first and then will, for example, give the sub-trees (1,1,10) and (1,1,12) to the other threads (e.g., Thread 2 or Thread 3) to handle.

Nested Parallel Operations

In accordance with an embodiment of the present invention, execution of a work unit from one parallel operation could run into another operation that could potentially be parallelized too. When the second operation enters the parallelization mode, this is referred to as a nested parallel operation.

An example of this scenario is parallelized construction of a Stargate over a cube with rules, where rules drive the cube's leaf level cell values. Computation of the rule driven values can access values of cells from different cube contexts. When a rule calculation requests values of a consolidated cell, TM1® can start computation of another Stargate or enter a single cell consolidation mechanism. Both of these operations could switch to the parallel execution mode.

As an example, consider a cube with the following rule based measure:

[% Sales]=N: [Sales]/[Sales, AllProduct], representing a percentage of sales of a given product within overall sales of all products.

The following crosstab could be considered as one of the scenarios leading to nested parallel operations:

|  | % Sales | | |
| --- | --- | --- | --- |
|  | Sedan | Truck | SUV |
| USA |  |  |  |
| Canada |  |  |  |
| UK |  |  |  | where [Sedan], [Truck], [SUV] are the members of the Product dimension.

First, execution of a query populating the crosstab will run into the operation of a Stargate construction, which will be computed based on the cube leaf cell values associated with [% Sales]. Assume a query parallelization strategy where the Stargate construction will be immediately split into multiple work units to be run in concurrently.

A given [% Sales] member is rule based at the cube leaf level. The rule computation will start when Stargate construction requests leaf cell values associated with [% Sales]. Given the expression definition "[Sales]/[Sales, AllProduct]" the Stargate construction will first request the [Sales] numbers in a given context, which can be done, for example, through simple TM1® cube data tree access. However, a [Sales, AllProduct] reference computation will request a consolidation cell, as it will be associated with the [AllProduct] consolidated member. The value of the consolidation cell would be another operation that could be parallelized.

Figure 14:
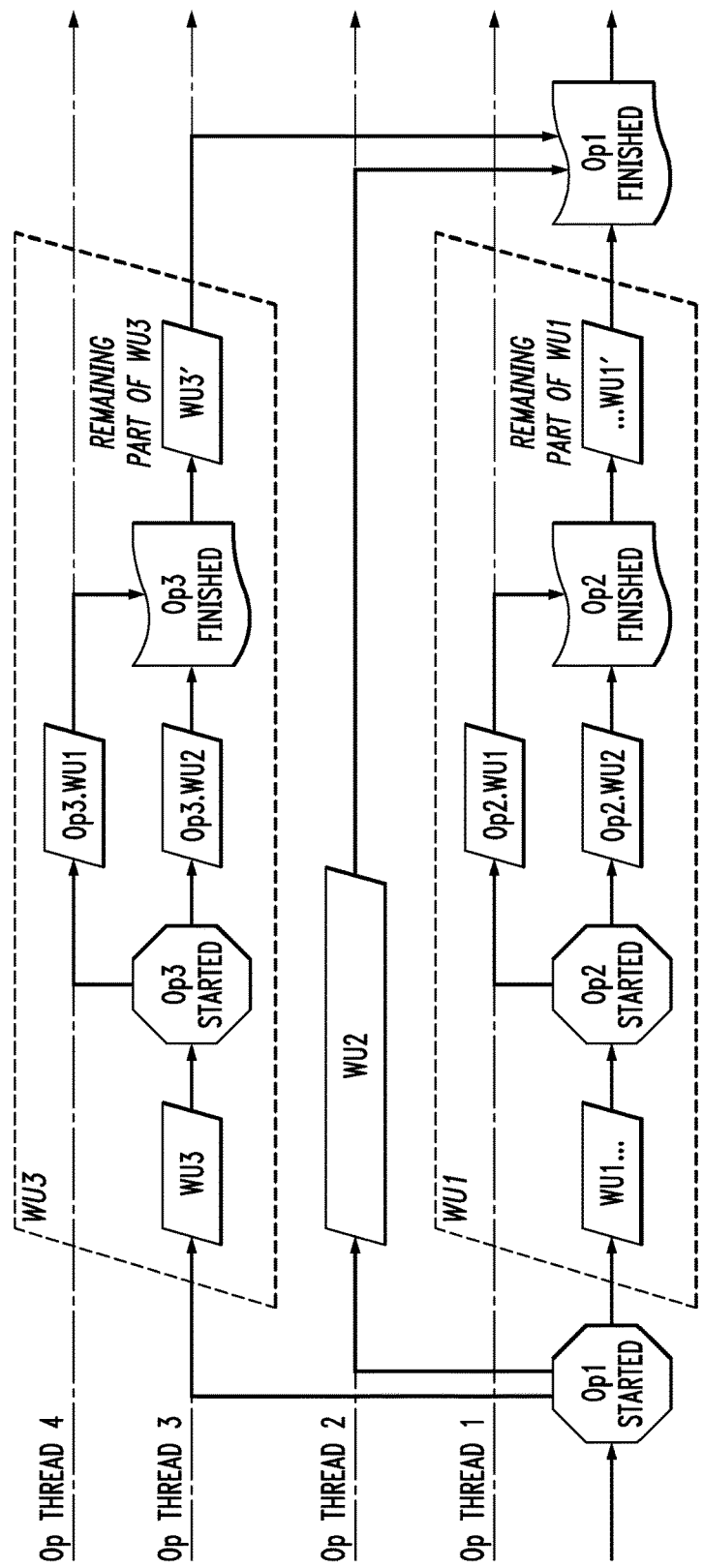
FIG. 14 is a high level diagram illustrating a parallel operation dependency in a method for processing a query in accordance with an embodiment of the present invention.

At a high level, the parallel operation dependency is shown in FIG. 14. Referring to FIG. 14, Operation 1 is split into three work units: WU1, WU2, WU3. Execution of WU1 and WU3 runs into a nested parallel operation at a certain point of the overall work assigned to the work units. In FIG. 14, every instance of a parallel operation requires synchronization of the work unit activities at the end (depicted with a flag shaped block). The synchronization comes with cost to be considered to drive a load balancing strategy in the system of nested operation.

The operation nesting could be of arbitrary depth. When driven by, for example, TM1® rule definition, the nesting depth will grow with the complexity of recursive dependencies of the rule definition.

As can be understood from FIG. 14, operations and work units at a given point in time form a tree of activities involved in execution of the root operation Op1. The tree is dynamic, expanding and collapsing as execution progresses. When mapping the tree to parallel operations associated with tree traversal, it is possible to see nested operation activities as part of global tree traversal, as shown in FIG. 15.

Figure 15:
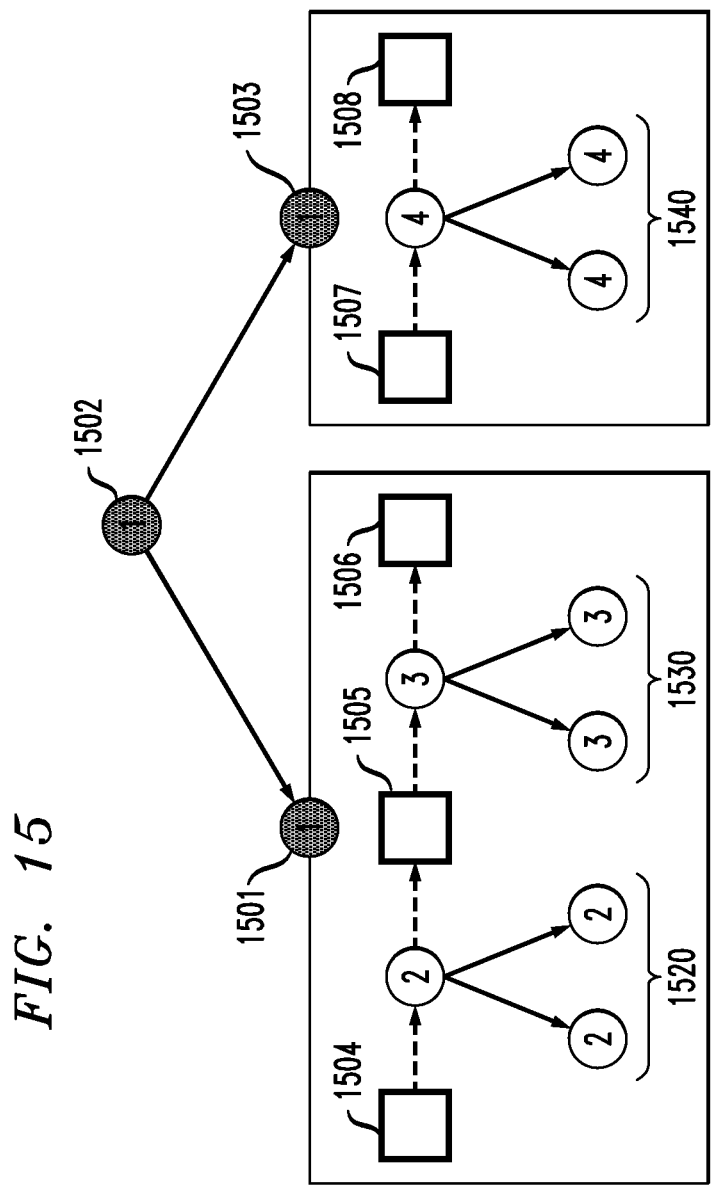
FIG. 15 is a schematic diagram illustrating that content of nested operations could be considered as part of a compound tree in a method for processing a query in accordance with an embodiment of the present invention.

Referring to FIG. 15, the nodes 1501, 1502 and 1503 marked with 1 represent the tree of the root operation associated with tree traversal. The activity associated with the leaf node of the root tree is assumed to run a set of execution steps that is represented as a sequence of the execution instructions illustrated as black boxes 1504, 1505, 1506, 1507 and 1508, and nested operations associated with the tree traversal. The content of nested operations 2, 3 and 4 (designated as 1520, 1530 and 1540) could be considered as part of a compound tree.

Figure 16:
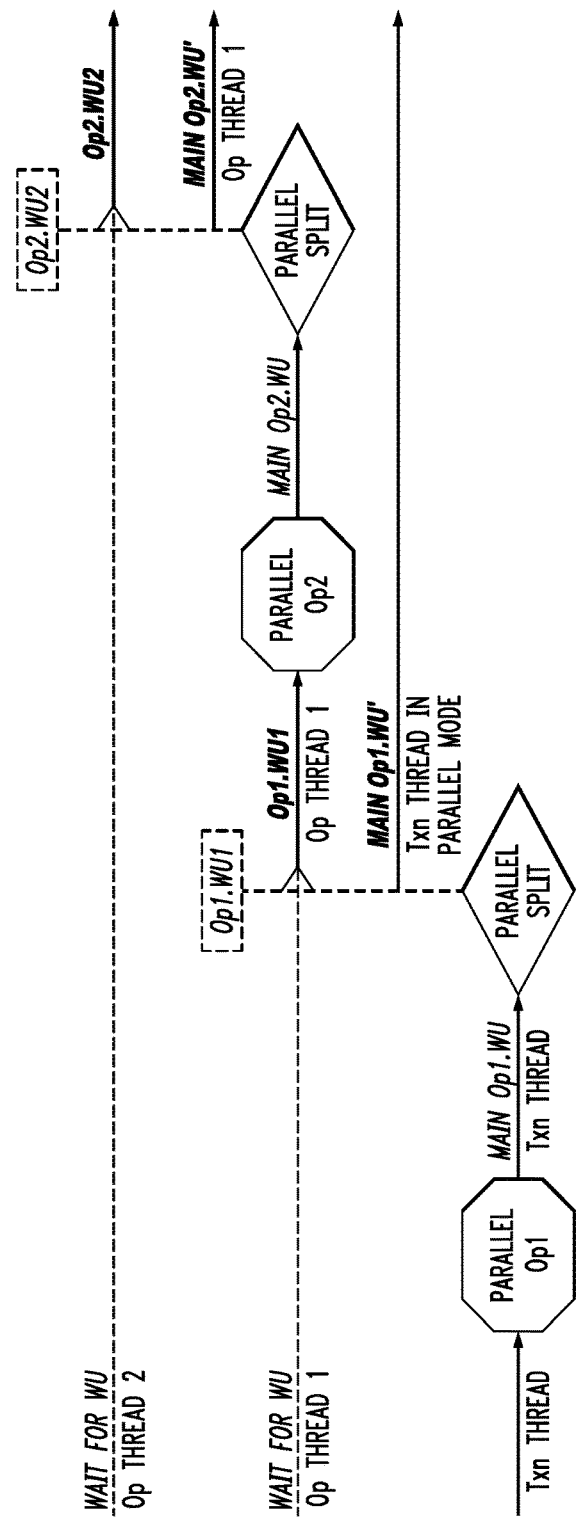
FIG. 16 is a high level diagram illustrating a synchronization mechanism in the presence of a nested operation in a method for processing a query in accordance with an embodiment of the present invention.

FIG. 16 illustrates a synchronization mechanism in the presence of the nested operation. As in the case of the root operation, nested operation Op2 starts with a single main work unit (Main.Op2.WU) executed in non-parallel mode of the operation Op2 (effectively being part of parallelization of the Op1 at this point). Once operation Op2 identifies need for split-for-parallelization, Op2.WU2 is extracted from MainOp2.WU, and Op2 enters the parallelization mode.

As the number of instances of nested operations could get rather large, proper heuristics of entering parallelization mode only for reasonably large operations becomes more important to eliminate the overhead of the parallelization infrastructure on small operations.

Figure 17:
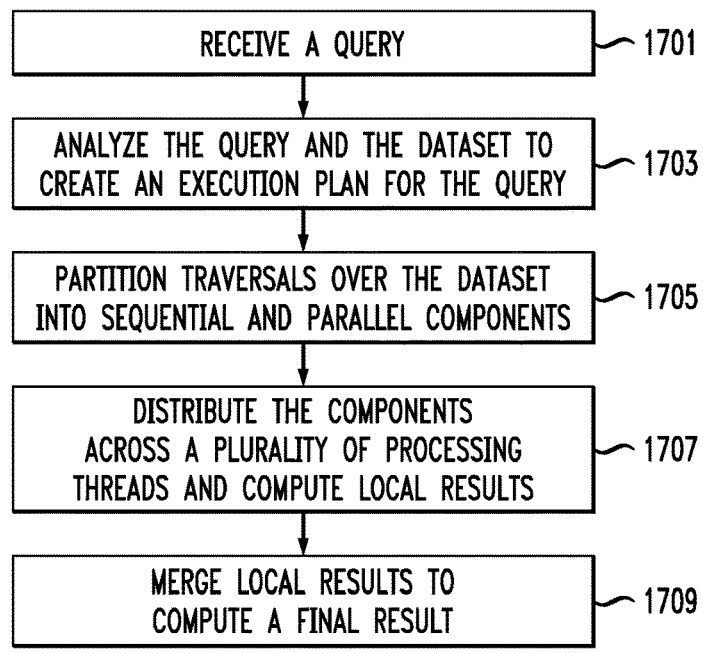
FIG. 17 is a flow diagram of a method for processing a query, according to an exemplary embodiment of the invention.

Referring to FIG. 17, a flow diagram of a method for processing a query, according to an embodiment of the present invention, is shown. The method 1700 comprises receiving the query (block 1701) and analyzing the query and the dataset to create an execution plan for the query (block 1703). In accordance with an embodiment, the dataset is a tree-based dataset having a tree structure. Creating the execution plan includes partitioning traversals over the dataset into sequential and parallel components (block 1705), and distributing the components across a plurality of processing threads that independently traverse their portion of the dataset and compute local results (block 1707). The local results are merged to compute a final result (block 1709). The merging includes merging nodes of a plurality of sub-trees to create a merged sub-trees, wherein the merging of the nodes of the plurality of sub-trees initially occurs at less than a total number of levels in the sub-trees. Leaves of the merged sub-tree can be assigned to different processing threads, and some of the leaves of the merged sub-tree can be reassigned from a first processing thread to a second processing thread when the second processing thread becomes available to take on more work.

To determine if a partition is required, it is determined if an AllowedNumberOfRunningUnits (see Eq. 1 above) is exceeded by an actual number of running-units for a given transaction. If so, a current work unit is Split-For-Interruption. If an AllowedNumberOfRunningUnits is higher than an actual number of running and queued units for a given transaction, then a current work unit is Split-For-Parallelization.

In the case of Split-For-Interruption, the partitioning comprises limiting a current work unit with coordinates of a current leaf node to create a first work unit, and creating a second work unit by using a right-most branch of the current work unit and using a left-most branch based on coordinates of the current leaf node incremented by one at a lowest level.

In the case of Split-For-Parallelization, the partitioning comprises splitting an unvisited portion of a work unit to distribute the work unit across a plurality of work units, wherein if a traversal position of the work unit does not leave an unvisited node on a first level, the splitting occurs on a next level down that contains an unvisited node.

A number of the plurality of work units can be determined based on at least a number of nodes left unvisited at a level where the splitting occurs and/or a number of available processing threads.

Figure 18:
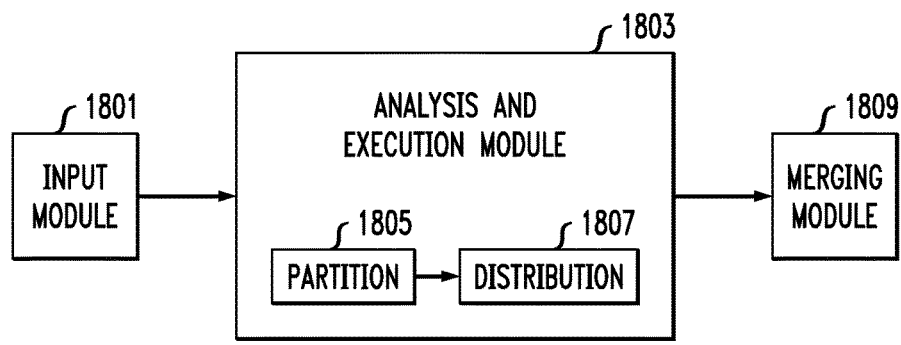
FIG. 18 is high-level diagram showing detail of a system for processing a query, according to an exemplary embodiment of the invention.

Referring to FIG. 18, which is a high-level diagram of a system 1800 for processing a query, according to an embodiment of the present invention, the system includes an input module 1801 capable of receiving the query, and an analysis and execution module 1803 capable of analyzing the query and the dataset to create an execution plan for the query. The analysis and execution module comprises a partition module 1805 capable of partitioning traversals over the dataset into sequential and parallel components, and a distribution module 1807 capable of distributing the components across a plurality of processing threads that independently traverse their portion of the dataset and compute local results. The system 1800 further includes a merging module 1809 capable of merging the local results to compute a final result.

In order to determine if the partitioning is required, the analysis and execution module 1803 is further capable of comparing, prior to the partitioning, an allowed number of running work units to an actual number of running work units for the query. In the case of a Split-For-Interruption, the partition module 1805 is further capable of limiting a current work unit with coordinates of a current leaf node to create a first work unit, and creating a second work unit by using a right-most branch of the current work unit and using a left-most branch based on coordinates of the current leaf node incremented by one at a lowest level. In the case of a Split-For-Parallelization, the partition module 1805 is further capable of splitting an unvisited portion of a work unit to distribute the work unit across a plurality of work units. If a traversal position of the work unit does not leave an unvisited node on a first level, the splitting occurs on a next level down that contains an unvisited node.

The partition module 1805 is also capable of determining a number of the plurality of work units based on a number of nodes left unvisited at a level where the splitting occurs and/or a number of available processing threads.

The merging module 1809 is further capable of merging nodes of a plurality of sub-trees to create a merged sub-tree, wherein the merging of the nodes of the plurality of sub-trees initially occurs at less than a total number of levels in the sub-trees. The merging module 1809 is also capable of assigning leaves of the merged sub-tree to different processing threads, and reassigning some of the leaves of the merged sub-tree from a first processing thread to a second processing thread when the second processing thread becomes available to take on more work.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 19:
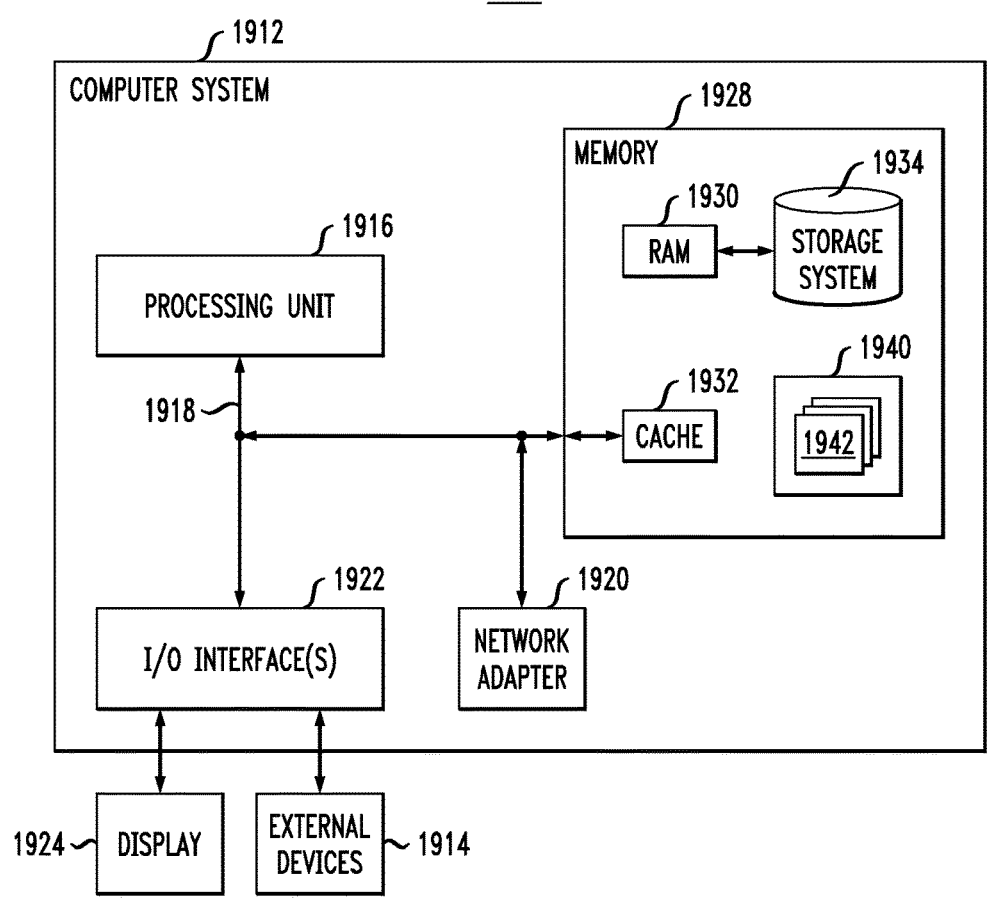
FIG. 19 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 19, in a computing node 1910 there is a computer system/server 1912, which is operational with numerous other general purpose or special purpose computing system environments or configurations. Examples of well-known computing systems, environments, and/or configurations that may be suitable for use with computer system/server 1912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 19, computer system/server 1912 in computing node 1910 is shown in the form of a general-purpose computing device. The components of computer system/server 1912 may include, but are not limited to, one or more processors or processing units 1916, a system memory 1928, and a bus 1918 that couples various system components including system memory 1928 to processor 1916.

The bus 1918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1912 typically includes a variety of computer system readable media. Such media may be any available media that is accessible by computer system/server 1912, and it includes both volatile and non-volatile media, removable and non-removable media.

The system memory 1928 can include computer system readable media in the form of volatile memory, such as random access memory (RAM) 1930 and/or cache memory 1932. The computer system/server 1912 may further include other removable/non-removable, volatile/nonvolatile computer system storage media. By way of example only, storage system 1934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1918 by one or more data media interfaces. As depicted and described herein, the memory 1928 may include at least one program product having a set (e.g., at least one) of program modules that are configured to carry out the functions of embodiments of the invention. A program/utility 1940, having a set (at least one) of program modules 1942, may be stored in memory 1928 by way of example, and not limitation, as well as an operating system, one or more application programs, other program modules, and program data. Each of the operating system, one or more application programs, other program modules, and program data or some combination thereof, may include an implementation of a networking environment. Program modules 1942 generally carry out the functions and/or methodologies of embodiments of the invention as described herein.

Computer system/server 1912 may also communicate with one or more external devices 1914 such as a keyboard, a pointing device, a display 1924, etc., one or more devices that enable a user to interact with computer system/server 1912, and/or any devices (e.g., network card, modem, etc.) that enable computer system/server 1912 to communicate with one or more other computing devices. Such communication can occur via Input/Output (I/O) interfaces 1922. Still yet, computer system/server 1912 can communicate with one or more networks such as a local area network (LAN), a general wide area network (WAN), and/or a public network (e.g., the Internet) via network adapter 1920. As depicted, network adapter 1920 communicates with the other components of computer system/server 1912 via bus 1918. It should be understood that although not shown, other hardware and/or software components could be used in conjunction with computer system/server 1912. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for processing a query of a tree-based dataset, comprising:
    a memory and at least one processor coupled to the memory, wherein the at least one processor is configured to:
    receive the query;
    analyze the query and the dataset to create an execution plan for the query, wherein, in analyzing the query and the dataset to create the execution plan, the at least one processor is further configured to:
        partition traversals over the dataset into sequential and parallel components;
        distribute the sequential and the parallel components across a plurality of processing threads that independently traverse their portion of the dataset and compute local results; and
        compare, prior to partitioning the traversals, an allowed number of running work units to an actual number of running work units for the query;
        wherein the allowed number of running work units is a function of a ceiling of a number of operation threads used for a given transaction with respect to a number of parallelized transactions; and
        wherein, in partitioning the traversals over the dataset, the at least one processor is configured to:
        split a current work unit for parallelization in response to the allowed number of running work units exceeding the actual number of running work units and queried work units for the query;
        split a current work unit for interruption in response to the allowed number of running work units being exceeded by the actual number of running work units for the query; and
    merge the local results to compute a final result, wherein, in merging the local results to compute the final result, the at least one processor is configured to merge nodes of a plurality of sub-trees to create a merged sub-tree;
        wherein, in splitting the current work unit for parallelization, the at least one processor is further configured to:
            split an unvisited portion of the current work unit to distribute the current work unit across a plurality of work units; and
            determine a number of the plurality of work units based on a minimum of a number of nodes left unvisited at a level where the splitting occurs and a number of available processing threads plus one operation thread to account for the current work unit.

2. The system according to claim 1, wherein, in splitting the current work unit for interruption, the at least one processor is further configured to:
    limit a current work unit with coordinates of a current leaf node to create a first work unit; and
    create a second work unit by using a right-most branch of the current work unit and using a left-most branch based on coordinates of the current leaf node incremented by one at a lowest level.

3. The system according to claim 1, wherein if a traversal position of the current work unit does not leave an unvisited node on a first level, the splitting occurs on a next level down that contains an unvisited node.

4. The system according to claim 1, wherein the merging of the nodes of the plurality of sub-trees initially occurs at less than a total number of levels in the sub-trees.

5. The system according to claim 1, wherein the at least one processor is further configured to assign leaves of the merged sub-tree to different processing threads.

6. The system according to claim 5, wherein the at least one processor is further configured to reassign some of the leaves of the merged sub-tree from a first processing thread to a second processing thread when the second processing thread becomes available to take on more work.

7. A method for processing a query of a tree-based dataset, the method comprising:
    receiving the query;
    analyzing the query and the dataset to create an execution plan for the query, wherein analyzing the query and the dataset to create the execution plan comprises:
        partitioning traversals over the dataset into sequential and parallel components; and
        distributing the components across a plurality of processing threads that independently traverse their portion of the dataset and compute local results; and
    merging the local results to compute a final result, wherein merging the local results to compute the final result comprises merging nodes of a plurality of sub-trees to create a merged sub-tree;
    wherein the analyzing further comprises comparing, prior to the partitioning, an allowed number of running work units to an actual number of running work units for the query;
    wherein the allowed number of running work units is a function of a ceiling of a number of operation threads used for a given transaction with respect to a number of parallelized transactions;
    wherein partitioning the traversals over the dataset comprises:
    splitting a current work unit for parallelization in response to the allowed number of running work units exceeding the actual number of running work units and queried work units for the query; and
    splitting a current work unit for interruption in response to the allowed number of running work units being exceeded by the actual number of running work units for the query;
    wherein splitting the current work unit for parallelization comprises splitting an unvisited portion of the current work unit to distribute the current work unit across a plurality of work units; and wherein a number of the plurality of work units is determined based on a minimum of a number of nodes left unvisited at a level where the splitting occurs and a number of available processing threads plus one operation thread to account for the current work unit; and wherein the steps of the method are performed by a computer system comprising a memory and at least one processor coupled to the memory.

8. The method according to claim 7, wherein splitting the current work unit for interruption comprises:
   limiting a current work unit with coordinates of a current leaf node to create a first work unit; and
   creating a second work unit by using a right-most branch of the current work unit and using a left-most branch based on coordinates of the current leaf node incremented by one at a lowest level.

9. The method according to claim 7, wherein if a traversal position of the current work unit does not leave an unvisited node on a first level, the splitting occurs on a next level down that contains an unvisited node.

10. The method according to claim 7, wherein the merging of the nodes of the plurality of sub-trees initially occurs at less than a total number of levels in the sub-trees.

11. The method according to claim 7, further comprising assigning leaves of the merged sub-tree to different processing threads.

12. The method according to claim 11, further comprising reassigning some of the leaves of the merged sub-tree from a first processing thread to a second processing thread when the second processing thread becomes available to take on more work.

13. A computer program product for processing a query of a tree-based dataset, the computer program product comprising a computer readable storage medium having program instructions embodied therewith, the program instructions executable by a processor to cause the processor to perform a method comprising:
   receiving the query;
   analyzing the query and the dataset to create an execution plan for the query, wherein analyzing the query and the dataset to create the execution plan comprises:
      partitioning traversals over the dataset into sequential and parallel components; and
      distributing the components across a plurality of processing threads that independently traverse their portion of the dataset and compute local results; and
   merging the local results to compute a final result, wherein merging the local results to compute the final result comprises merging nodes of a plurality of sub-trees to create a merged sub-tree;
   wherein the analyzing further comprises comparing, prior to the partitioning, an allowed number of running work units to an actual number of running work units for the query;
   wherein the allowed number of running work units is a function of a ceiling of a number of operation threads used for a given transaction with respect to a number of parallelized transactions;
   wherein partitioning the traversals over the dataset comprises:
   splitting a current work unit for parallelization in response to the allowed number of running work units exceeding the actual number of running work units and queried work units for the query; and
   splitting a current work unit for interruption in response to the allowed number of running work units being exceeded by the actual number of running work units for the query;
   wherein splitting the current work unit for parallelization comprises splitting an unvisited portion of the current work unit to distribute the current work unit across a plurality of work units; and
   wherein a number of the plurality of work units is determined based on a minimum of a number of nodes left unvisited at a level where the splitting occurs and a number of available processing threads plus one operation thread to account for the current work unit.

14. The computer program product according to claim 13, wherein splitting the current work unit for interruption comprises:
   limiting a current work unit with coordinates of a current leaf node to create a first work unit; and
   creating a second work unit by using a right-most branch of the current work unit and using a left-most branch based on coordinates of the current leaf node incremented by one at a lowest level.

15. The computer program product according to claim 13, wherein:
   the merging of the nodes of the plurality of sub-trees initially occurs at less than a total number of levels in the sub-trees; and
   the method further comprises assigning leaves of the merged sub-tree to different processing threads.

* * * * *